United States Patent [19]
Keller et al.

[11] 4,084,183
[45] Apr. 11, 1978

[54] METHOD FOR THE ELECTRO-OPTICAL REPRODUCTION OF HALF-TONE PICTURES

[75] Inventors: Hans Keller, Kiel; Roman Koll, Kiel-Wellingdorf; Heinz Taudt, Kiel, all of Germany

[73] Assignee: Dr. Ing. Rudolf Hell GmbH., Kiel, Germany

[21] Appl. No.: 567,122

[22] Filed: Apr. 11, 1975

Related U.S. Application Data

[63] Continuation of Ser. No. 124,864, Mar. 16, 1971, abandoned.

[30] Foreign Application Priority Data

Mar. 18, 1970 Germany .......................... 2012728

[51] Int. Cl.² ............................................. H04N 1/46
[52] U.S. Cl. ..................................... 358/75; 358/298
[58] Field of Search ..................... 178/6.6 B, 6.7 R; 358/75, 298

[56] References Cited

U.S. PATENT DOCUMENTS

| | | | |
|---|---|---|---|
| 1,849,544 | 3/1932 | Howey | 178/6.6 B |
| 2,863,000 | 12/1958 | Hell | 178/6.6 B |
| 3,272,918 | 9/1966 | Koll | 178/6.7 R |
| 3,402,278 | 9/1968 | Dernbach | 178/6.6 B |
| 3,436,472 | 4/1969 | Kyte | 178/6.7 R |
| 3,465,199 | 9/1969 | Simshauser | 178/6.6 B |
| 3,604,846 | 9/1971 | Behane | 178/6.7 R |
| 3,657,422 | 4/1972 | Taudt | 358/75 |

*Primary Examiner*—Howard W. Britton
*Attorney, Agent, or Firm*—Ernest F. Marmorek

[57] ABSTRACT

A method for the electro-optical reproduction of half-tone pictures in which the picture is subdivided into surface elements having covering spots therein corresponding to a tone value scale, wherein electronic recording data is produced from the surface elements and is stored, wherein by means of electrooptical scanning of a picture signals are obtained and are used to call up the recording data for the reproduction of the picture, the improvement resides in that several raster screens on the picture are formed and the meshes and the angle of rotation of such raster screens are selected in such a manner that an orthogonally oriented parcel screen having a congruent screen structure is obtained, and subdividing the parcels into smaller orthogonally oriented surface elements and obtaining recording data from such surface elements.

3 Claims, 14 Drawing Figures

METHOD FOR THE ELECTRO-OPTICAL REPRODUCTION OF HALF-TONE PICTURES

This is a continuation of application Ser. No. 124,864, filed Mar. 16, 1971 now abandoned.

FIELD OF THE INVENTION

The present invention relates to a method for the electro-optical reproduction of half-tone pictures in which according to a tone value scale surface elements with covering spots therein are formed, the magnitude of which corresponds always to the tone values of the tone grade scale, and in which electronic recording data are obtained and stored from the surface elements as well as picture signals are obtained by electrooptical scanning of a picture and which are used to call up the recording data for the replaying of the picture.

BACKGROUND OF THE INVENTION

In order that an observer of a picture reproduction could not notice the structure of the printing raster, in black and white pictures the raster screen or screens, which are essential for reproduction, are rotated with respect to the horizontal. During the production of a multi-color picture the raster screen of the individual color recordings or components must be rotated even with respect to each other in order to avoid the so-called Moire effects or color play.

Such rotation of the raster presents no problem in connection with flat bed electro-type machines since with such machines it can be done by simply rotating the picture carrier and the recording carrier by the desired raster rotation angle with respect to the recording direction while the recording device (an engraving stylus, writing glimm lamp or some similar device) records the raster by the raster signals superimposed on the picture signals always along the direction of the relative movement between the table and the recording means.

The necessity sometimes arises that such pictures should be produced also by means of orthogonally oriented machines such as drum type scanners or electronic composing machines. With this last mentioned machines the difficulty arises to attain a proper rotation of the raster. An oblique securing of the picture set and of the recording carrier such as on the drum of a drum-type scanner, cannot be considered for several reasons, one of them, carrying the most weight, being that the advancement and the peripheral velocity of the drum are always rectangular with respect to the axis of the drum. The smallest deviations from the desired values would lead to unacceptable Moire formations.

Some attempts have been made in connection with drum type electro-type machines to remedy the above by an appropriate shifting of the raster points from line to line and by appropriately selecting their distances, whereby different preferred directions of the pattern were attained which corresponded to the rotated raster angles. In connection with these rasters which are only pretended to have a raster rotation however, in the reproduction there was always a certain Moire effect present.

Further it became known to scan a certain graphical raster picture together with the scanning of the picture and the raster signals so obtained to superimpose on the picture signals. This proposition can be actually used but requires the above-mentioned oblique positioning. There is a disadvantage, however, accompanying such process, in that additional scanning and a longer or sometimes an additional drum is necessary. As a result, the complexity of the apparatus is increasing while the rotation itself is not quite accurate and the above-mentioned disadvantages still remain unremedied. The possibility of obtaining a true raster rotation can be attained only by the digital technique.

According to known composing methods of producing half-tone raster pictures by means of a photo composing machine, the tone value can be sub-divided and numbered into an infinite number of grades between white and black according to a tone value scale. To each tone value there is a raster field assigned which contains a black point having different sizes, and called a spot. The size of this spot determines the tone value which the raster field on the location of the picture surface to which it belongs, represents. White and very bright picture portions are represented by small spots while dark or black picture portions are represented by large spots or such which merely covers the entire raster field surface.

Raster fields having black spots in them can be regarded under the concept of the known photo composing methods as a small picture the reproduction of which on corresponding apparatus produces electronic recording data which can be stored in a storage device.

In the graphic art raster fields containing spots therein irrespective of their size are called "raster points". In order to avoid any misunderstanding this expression here should be avoided and the expression "spot" or "raster spot" will be used throughout this application.

In order to record the raster pictures the recording data of the raster spots are called out from the storage device by the picture signals which have been obtained during the scanning of the picture. The picture signals control the either simultaneously performed recording or they are also stored for later use.

The above described methods are still unable to solve or offer a solution to the problem to perform accurate recording and reproduction when the raster structure is not orthogonal, that is, when it is obliquely oriented with respect to the horizontal of the field view of an observer or when several raster structures are printed on top of each other in a superimposed fashion and which are rotated with respect to each other.

SUMMARY OF THE INVENTION

It is, therefore, an object of the present invention to provide a novel method of recording and reproducing of half-tone pictures having an orthogonally or non-orthogonally oriented raster or a plurality of rasters which are rotated with respect to each other and which reliably reproduce such pictures without the distorting effects encountered in using the known methods and apparatus.

It is also an object of the present invention to provide an apparatus for carrying out the above novel method.

According to the present invention the picture is covered with one or several raster screens the meshes and the angles of rotations of which are so coordinated that an orthogonally oriented large mesh congruent screen structure, or so-called "parcel" structure, is obtained, the parcels of which form a new superimposed orthogonally oriented screen.

According to the present invention the parcel is sub-divided into smaller orthogonally oriented surface elements which are used for ascertaining recording data. The size of the surface elements is preferably equal or smaller than the raster meshes.

In accordance with the present invention the parcels for each raster screen and for each tone value form a standard set having always similar and uniformly distributed masking spots and which serve also for the production of the recording data.

In the event that during the reproduction of colored pictures several raster screens are used, then according to the present invention one of the raster screens can be orthogonally oriented. The sub-division of the parcels then is performed through the orthogonally oriented raster screen.

According to a preferred embodiment of the invention the parcels comprise always quadratic meshes arranged three by three forming an orthogonally oriented raster screen; the lines of a further raster screen cut the corner points and the middle of the side lines of the parcel and are oriented at an angle of 45° while the lines of two further raster screens are inclined at an angle of + arc-tan ⅓ or − arc tan ⅓ and cut the corner points and/or the sides of the parcels always at their ⅓ or ⅔ length.

In order to reproduce color pictures a preferably not orthogonally oriented raster screen is used.

The invention further provides that the parcels are split into columns and by transversely subdividing the columns the surface elements are obtained. It is an advantage that by subdividing the parcels into surface elements equally sized raster elements are present.

In accordance with another embodiment of the present invention the subdivision of the parcels into columns and the columns into raster elements is performed on an orthogonally oriented raster screen.

The recording data is produced according to the present invention preferably by means of an optical-electronic scanner operating by scanning lines and columns during which the lines are stored as a series of numbers representing white or black point units.

In order to control the data storage device the address of that parcel is used which corresponds in tone value to the picture position being recorded and also controlled by the picture line recording and by a process controlled by the feed whereby an address shifting is affected to the extent that the data of those surface elements of the parcel control the recording which belong to the very point of the picture under recording.

By subdividing the parcel into surface elements it is advantageous to perform the subdivision in such a manner that many surface elements having similar or mirror-like spots therein are obtained, whereby the recording data of the similar surface elements located at different positions within the parcel can be stored at the same address and the recording data of the mirror-like surface elements are transferred before the recording into the operational register from which by means of an electronic control system they are delivered, in a reciprocal fashion, for recording in the individual axial direction.

The present invention is not limited to the use of a cross raster preferably used in the reproduction processes but it is extended also to cover raster screens the mashes of which are not only quadratic or rectangular or triangular but also which are of other shapes like rhomboid, hexagonal etc. Under the phrase cross-raster the raster having a quadratic mash structure is understood. Both raster structures can easily be combined as desired.

BRIEF DESCRIPTION OF THE DRAWINGS

The invention will become more readily apparent from the following description of preferred embodiments thereof shown in the accompanying drawings, in which:

FIG. 6 is an example for the electronic recording of two raster elements having spots shown therein as in the parcel shown in FIG. 5a.

DESCRIPTION OF THE PREFERRED EMBODIMENTS

Figure 1:
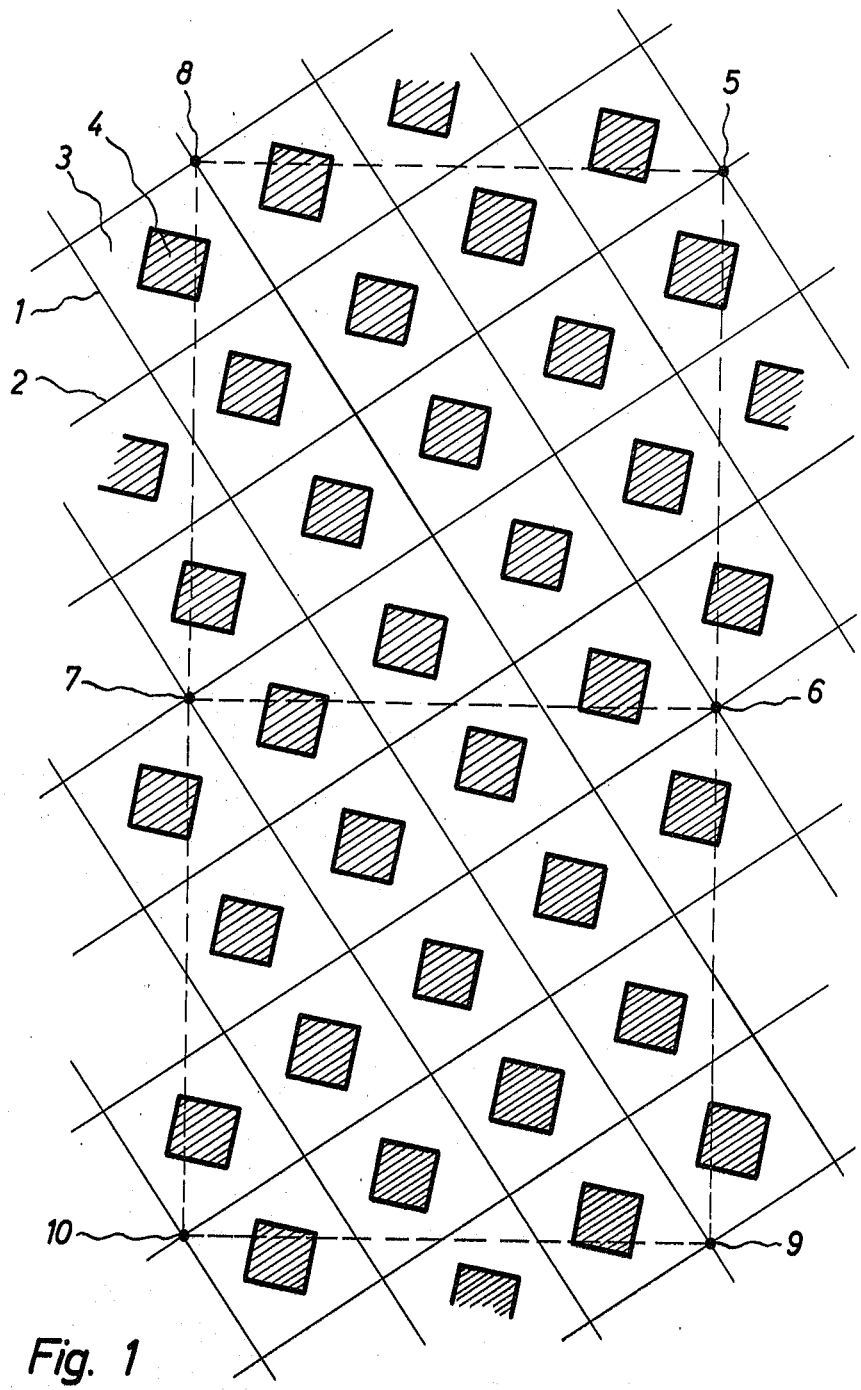
FIG. 1 illustrates two orthogonally oriented parcels consisting of a non-orthogonally oriented raster screen having a homogeneous tone value.

In the drawings like parts are identified by the same reference characters.

FIG. 1 illustrates a raster screen which comprises lines 1 and 2 through the crossings of which meshes are formed in which black spots are placed. The magnitude of the spots 4 represents the tone value which the portion of the picture on that spot should have and to which the corresponding mesh 3 belongs. The spots 4 have been selected to be equally sized and to have the same form since in the illustrating embodiment of FIG. 1 they represent a picture portion having a homogeneous tone value. The raster screen formed by the lines 1/2 and called hereinafter raster screen 1/2 is not oriented orthogonally. Under the concept of non-orthogonality one should understand that the lines of the screen are rotated with respect to the horizontal reference line of the field of view of an observer. The rotation of the raster screen is necessary for the reproduction of a single color picture in order to create a better picture impression in the observer. The optimum value of the angle of rotation of the raster screen and also the magnitude of the meshes are not exactly defined. The invention provides that the crossing points of the screen lines 1 and 2 are at the same time the crossing point of an orthogonal screen having larger meshes. Such crossing points 5, 6, 7 and 8 as well as 6, 7, 9 and 10 which are interconnected by a dashed line represent a mesh quadrate which is called in the following a parcel. It can be easily seen that also in the horizontal axial direction similar parcels are joined by congruent portions of the raster screen formed from the lines 1 and 2 and cover the entire picture field.

These individual parcels contain a few complete meshes 3 with undisturbed, that is, full spots 4. A few meshes 3 and also a few spots 4 become dissected by the border lines of the parcel. A geometrical balance is present in that the total surface of the meshes in each parcel adds up to a whole number of meshes so that the content of each parcel corresponds to an integer number of meshes. The present parcel shown in FIG. 1 comprises five full meshes with full undisturbed spots and 16 mesh portions some of them having only portions of the spot left therein, and which add up to eight full meshes. The parcel therefore contains altogether 13 meshes. This raster screen 1/2 which is not orthogonally oriented, is usually employed for the reproduction of monochromatic pictures.

Figure 2:
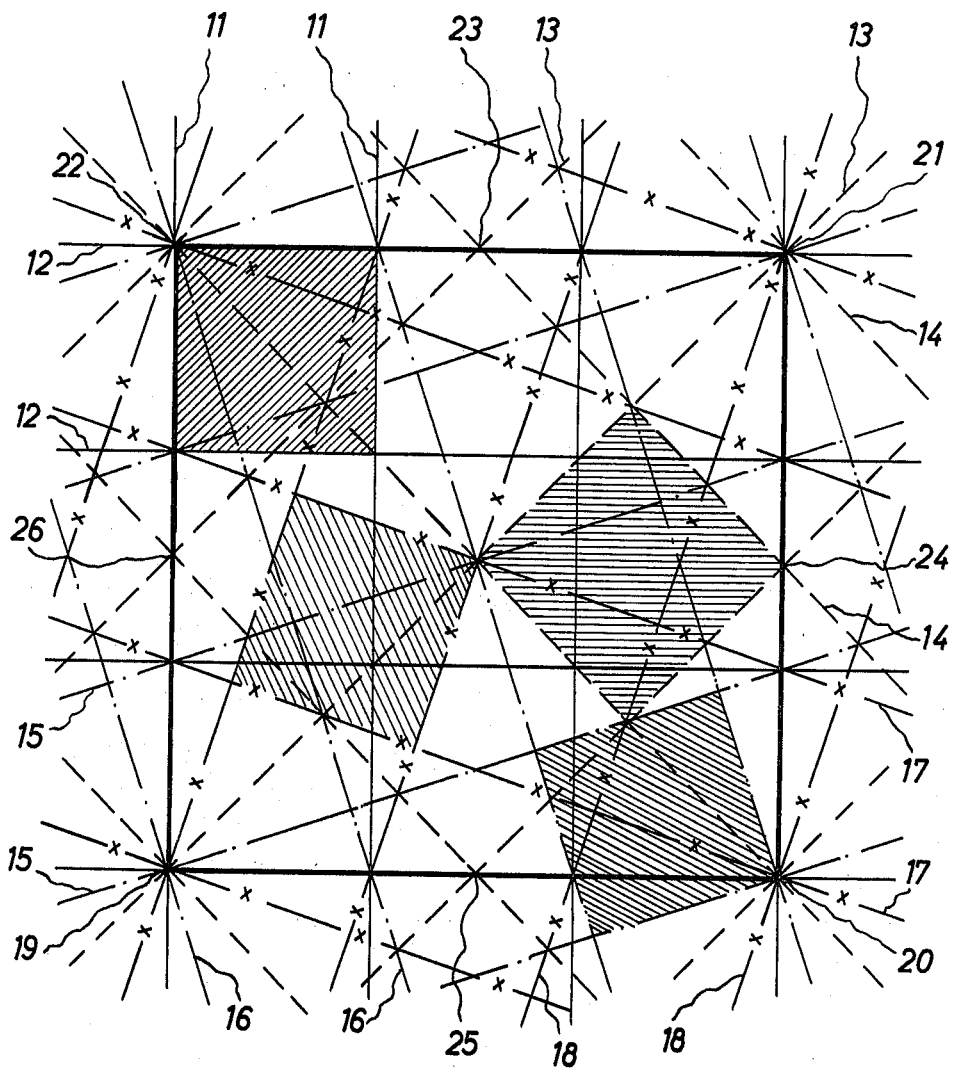
FIG. 2 illustrates an embodiment of the invention in which a parcel is formed from four superimposed raster screens.
Figure 2A:
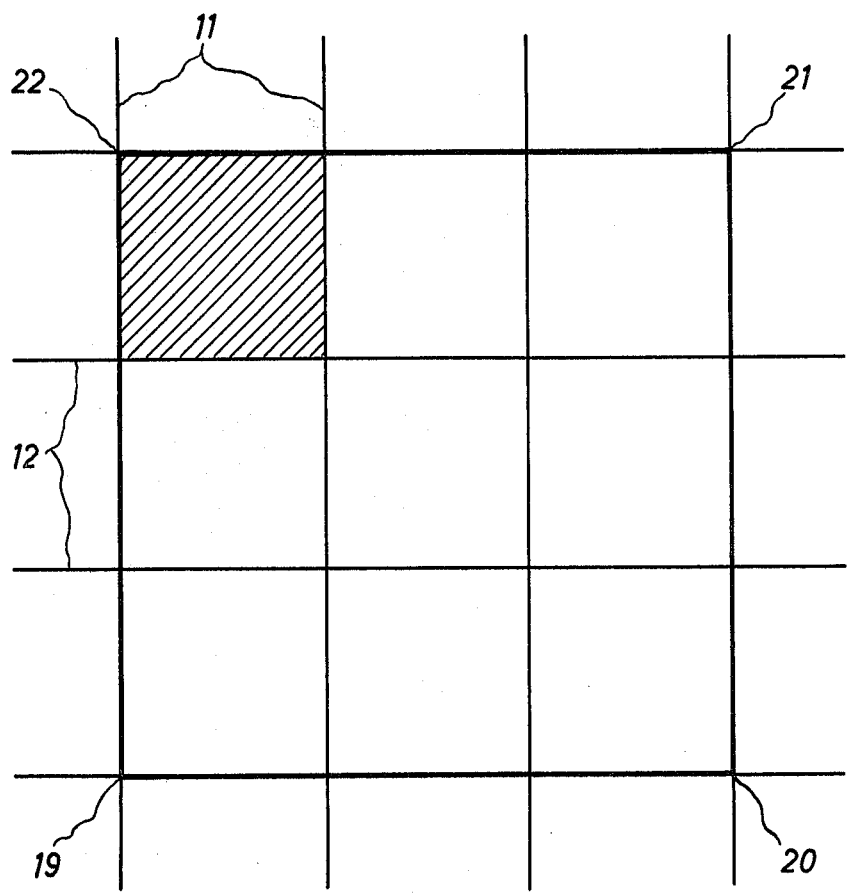
FIGS. 2a, 2b, 2c and 2d illustrate a resolution of the raster screens shown in FIG. 2.
Figure 2B:
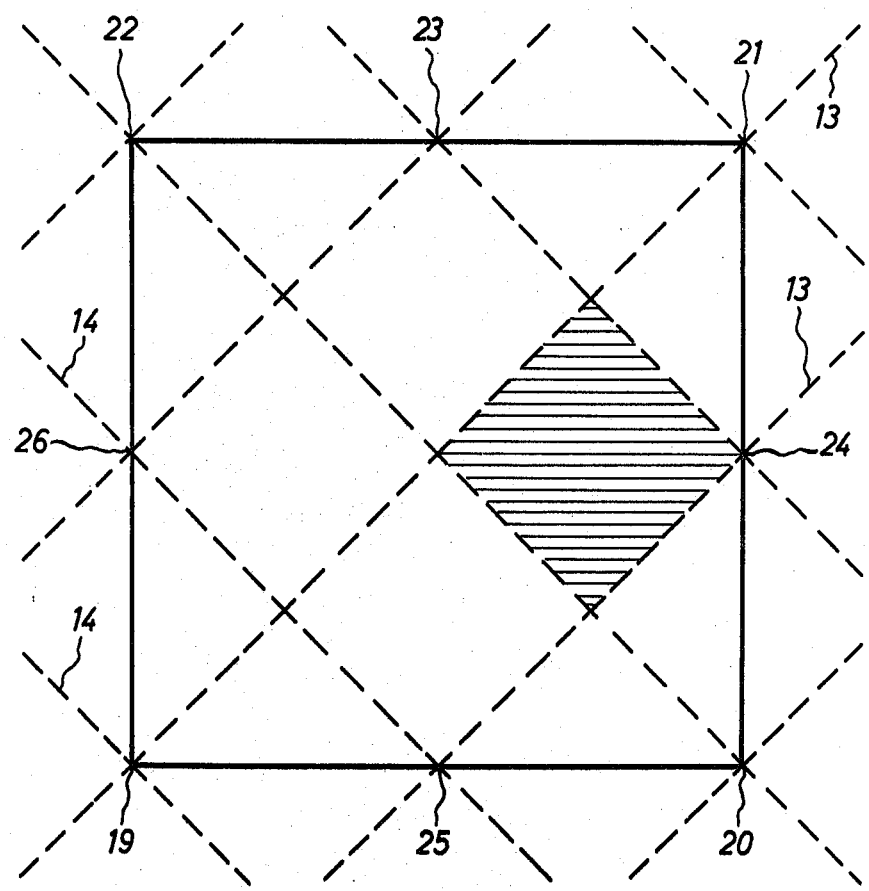
Figure 2C:
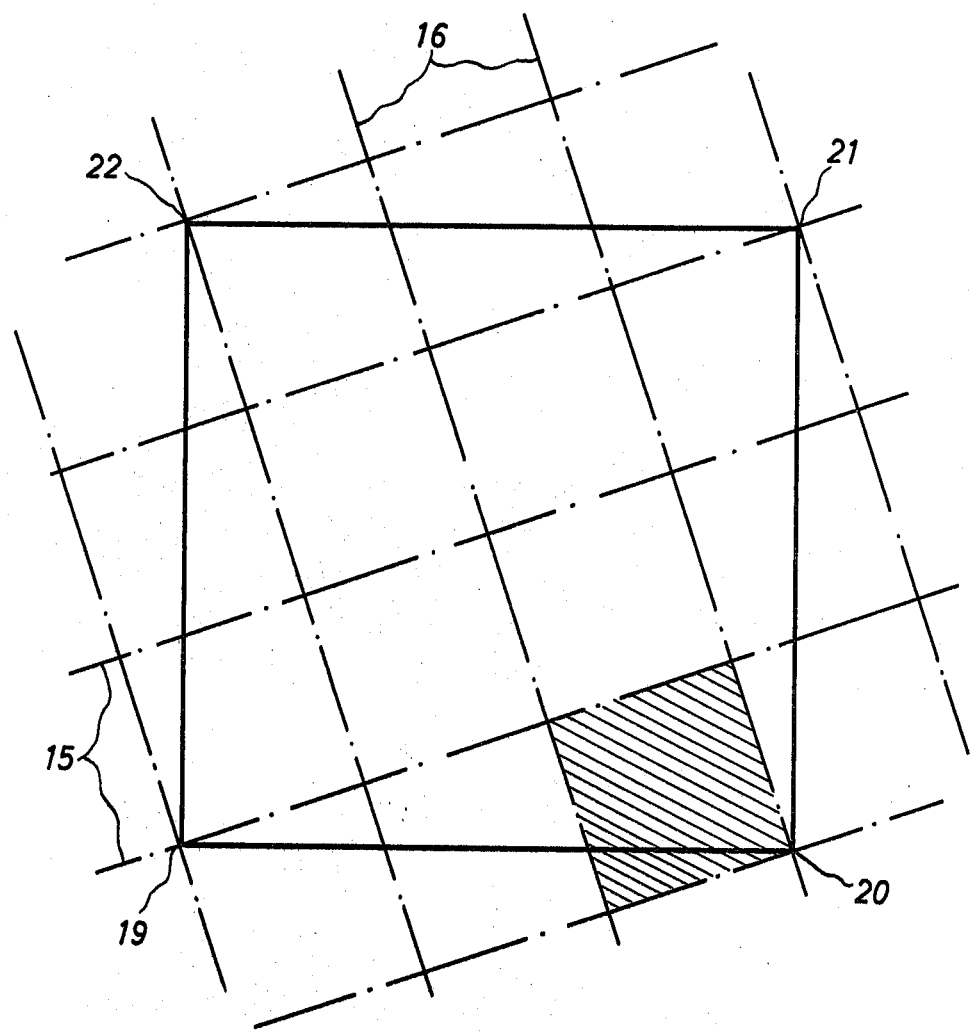
Figure 2D:
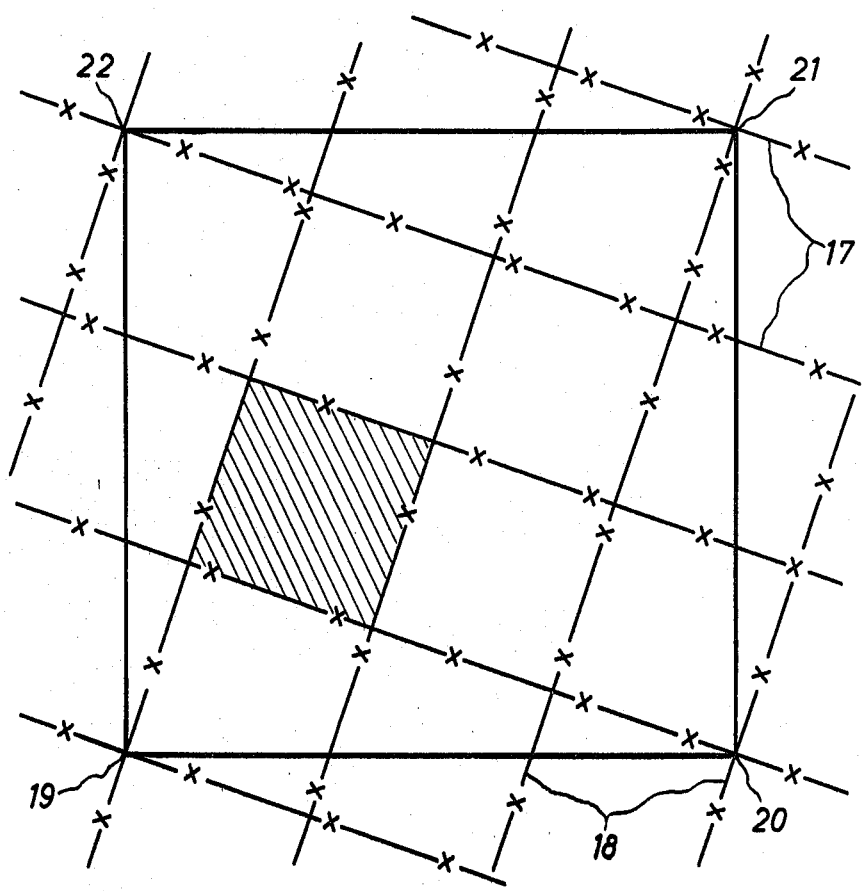

In the reproduction of multi-color pictures the individual color records or components are printed with their raster screens rotated with respect to each other. As shown in FIG. 2, the above-described principle of varying the mesh magnitude and the angle of rotation can be also successfully applied to multi-color prints. FIG. 2 illustrates a surface portion having four superimposed raster screens rotated with respect to each other and which are formed respectively by the lines 11/12, 13/14, 15/16 and 17/18. Each mesh of the component screens is represented by hatched lines. The raster magnitude, and consequently, the magnitude of the meshes of the individual screens is so dimensioned and the angle of rotation is so selected that a quadratic parcel results defined by the corner points 19, 20, 21 and 22.

The screen formed by lines 13/14 and shown by the dashed lines is inclined at 45° with respect to the horizontal axis. It is formed by the diagonal which passes through the corner points 19, 20, 21 and 22 of the parcel quadrate and by the lines running parallel therewith and which cut the sides of the quadrate in the middle, namely at points 23, 24, 25 and 26.

The screen 15/16 is inclined at an angle of arc $+\frac{1}{3}$ equals 18.3°. Similarly the lines of the screen indicated as a dashed-dot line are running through the corner points of the parcel and cut the side lines at $\frac{1}{3}$ or $\frac{2}{3}$ of their length. The screen 17/18 has a similar structure as the screen 15/16; however, it lies with respect to it in a mirror-image fashion. The raster lines of it also run through the corner points of the quadrate 19-20-21-22 and cut its side lines at $\frac{1}{3}$ and $\frac{2}{3}$ of their length. The lines of this raster screen are indicated by -x-x-.

One may find that the above described combined screen system can be extended in the horizontal and vertical directions to any extent. There are always parcels of equal magnitude joined together with congruent screen structures and covering the entire picture field.

In addition to the exemplary embodiment illustrated in FIG. 2 there are also further possibilities to construct parcels with congruent screen structure. For the smallest parcel one may, for instance, select four meshes of an orthogonally oriented raster screen representing a single color. Of course, one may construct larger parcels such as the four times four equal 16 mesh size.

In each case the parcels are as large in size which still enables them to be used in the reproduction. According to the present invention, the parcels, therefore, must be subdivided into smaller surface elements and recorded that way. These elements must have about the same magnitude as the mashes of the raster network. In a practical embodiment the following values have been found useful: A mesh of the orthogonally oriented screen 11/12 must at a resolution of 50 per/cm have a side length of 0.2 mm. A mesh of the screen 13/14 must have a side length of 0.225 mm and whereby it corresponds to a raster of 44.5 per/cm. The meshes of the screen 15/16 and 17/18 must have sidelengths of 0.18 mm and whereby they correspond to a resolution of 55.5 per/cm. For the average size mash the screen 11/12 having a side length of 0.22 mm supplies the standard size. In the above example the parcel has been subdivided into surface elements of equal magnitude which in the following are called the raster elements.

The tone characteristics of a picture, as we know, is given by the degree of covering, that is, by the magnitude of the spots and to some extent also by the picture portion represented by them. In the event the picture resolution is selected to be 50 per/cm, then nine raster elements are necessary to represent the tone value or grade of a parcel. The division of the parcel into raster elements corresponds then to the raster screen 11/12, that is, the raster elements in size then are equal to the mashes of such raster screen. It is noted that such division represents a simple and special case. There can be and there are much more complicated situations as will be hereinafter described.

Figure 3A:
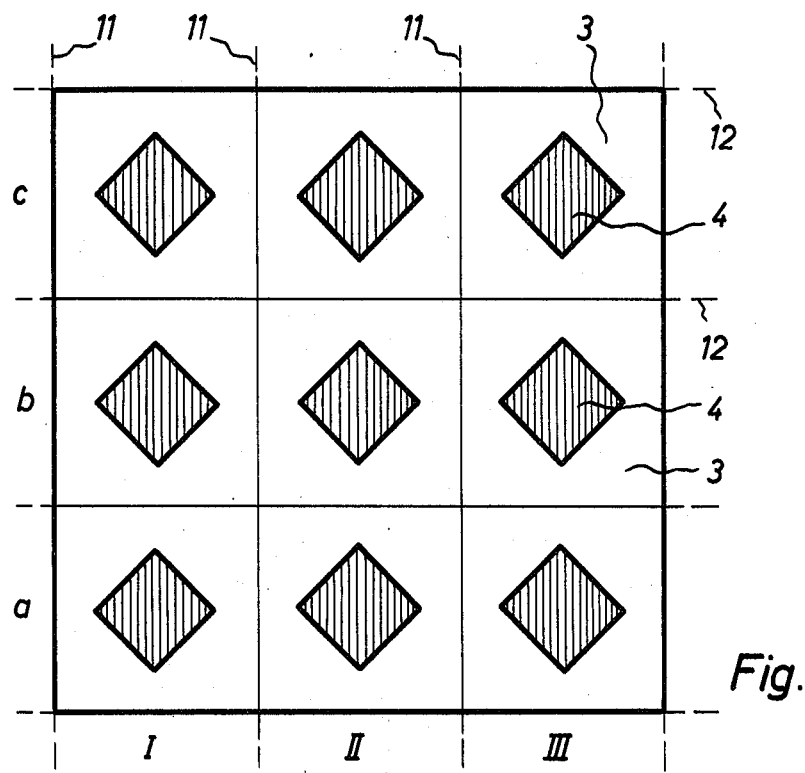
FIGS. 3a-3c illustrate parcel-size portions of the individual raster screens from FIG. 2 having uniformly and non-uniformly distributed spots therein.

FIG. 3a illustrates a parcel comprising the raster screen 11/12 and having a predetermined tone value as represented by the spots. Spots 4 in this figure have been selected for illustrative purposes as being quadrangles and they lie in the middle of the respective mashes 3, which correspond at the same time to the raster elements I$a$, II$a$, ... III$c$. For the entire parcel a homogeneous tone value has been assumed, so that all spots 4 are equally sized. The surface coverage, that is the sum of all spots 4 with respect to the parcel surface determines the tone value or degree of the associated picture portion. In the present example it can have a numerical value of about 20%.

Figure 3B:
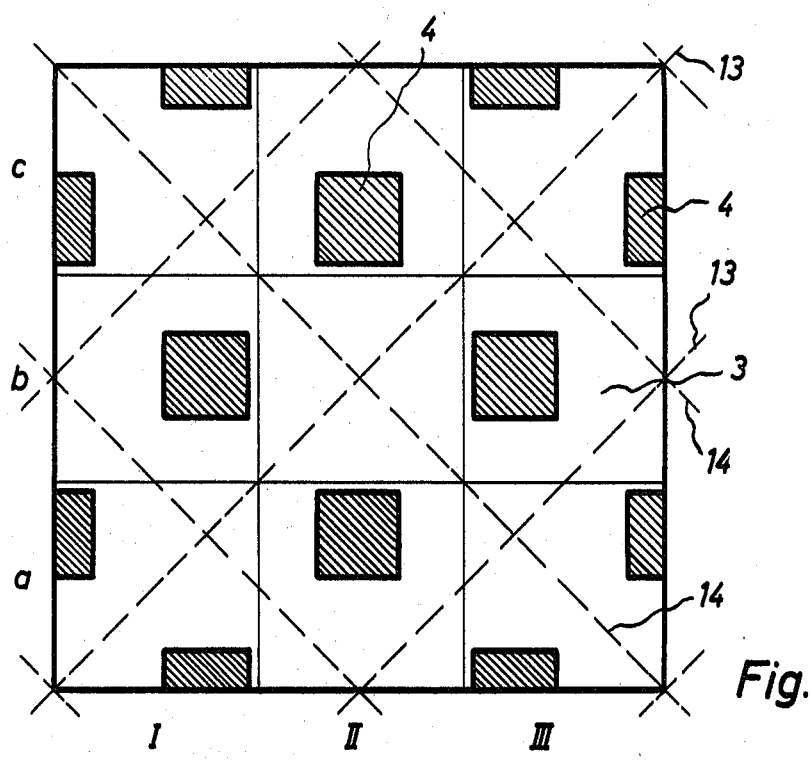

A similar coverage degree is illustrated in FIG. 3b. The spot distribution here follows the distribution of the raster screen 13/14, the meshes 3 of which as represented by the dashed line do not coincide with their side lines with the raster elements. The spots 4, which lie centrally in the meshes 3, are shown to be non-uniformly distributed over the parcel. They are even partially dissected and each belongs to a pair of raster elements.

For the mashes of the screens 15/16 and 17/18 similar relationships can be found. The screen lines 15/16 represented by the dashed line in FIG. 3c run across the picture surface correspondingly under a differently inclined angle. The spot distribution is represented at a similar tone value of about 20%. The raster screen 17/18 would be a mirror image of FIG. 3c and, therefore, is not shown.

It should be noted that the scanning and the recording of the picture which should be reproduced is performed starting from the bottom towards the top and in picture lines which are disposed next to each other running from left to the right. The columns I, II and III of the parcel represent then portions of three picture lines disposed next to each other. During the reproduction of the parcel then first the raster elements I$a$, I$b$ and I$c$ are recorded which form the first column of the parcel and which belong to the first picture line. The columns II$a$, II$b$, II$c$ and III$a$, III$b$, III$c$ follow each other after relatively large time periods namely, after the recording of a full picture line or in the event of a drum-type machine, after each full revolution of the drum. The parcel, therefore, is part of three picture lines.

It has been further assumed that the parcel is associated with a portion of the picture having a homogeneous tone value. For this reason all the spots are equally sized and shaped. They can appear in a variety of shapes such as cirle, ellipse, rectangle or, as it is in the present example, quadrate. Even if they are to represent a large coverage degree, they should not extend beyond the border lines of the mashes.

Figure 3C:
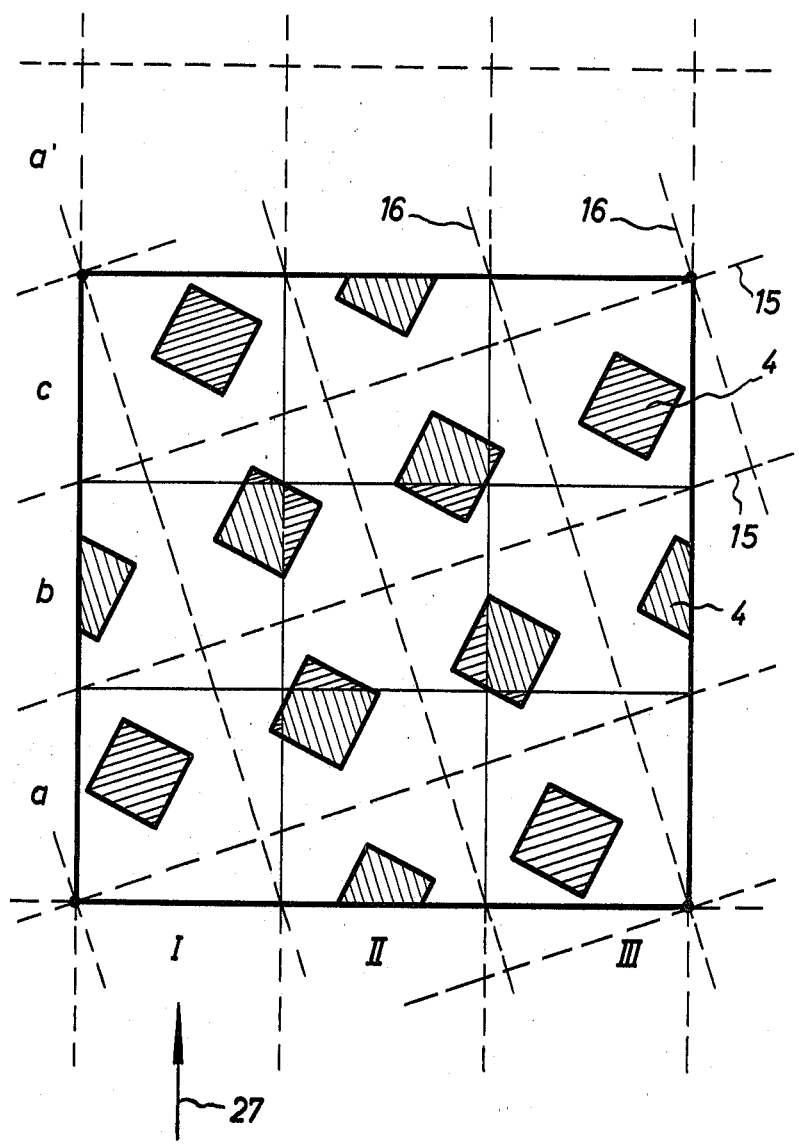

As seen in FIG. 3c which represents a parcel from the raster screen formed by the lines 15/16, the border lines of which separate the parcel quadrate into nine fields, cut up the uniformly distributed spots 4 in a non-uniform fashion. By the longitudinal and transverse division of this parcel the raster elements I*a*–III*c* are formed. The coverage surface corresponding to the tone value of the raster element corresponds to the sum of the spots and spot portions within the raster element. A parcel, for example, which represents a certain defined tone value comprises nine raster elements. At 64 tone value classes there will be 576 raster elements necessary. For all the last mentioned number of the raster elements there must be an electronic recording data obtained and stored. A similar number of raster elements is necessary to be used with raster screen 17/18, since it is a mirror-image of the screen 15/16.

The raster screen formed with the lines 11/12 represents an exception when dimensioned as in the example seen in FIG. 3a. The mashes and the raster elements are identical and all the raster elements belonging to one parcel are equal. As a result, it becomes possible that for each raster element the recording information can be stored only once so that relatively small storage capacity is required.

The structure of the raster screen 13/14 shown in FIG. 3b for which the raster elements I*a* . . . III*c* are again recorded at the same tone value, resembles a certain symmetry. The raster elements I*a*, I*c*, III*a* and III*c* are with respect to the horizontal and vertical axis mirror images and so are the raster elements I*b*, II*a*, III*b* and II*c*. In connection with this example it is also possible to save quite a lot of storage space since it becomes sufficient that the recording information of a raster element is stored only once. By controlling the deflection of the scanning electron beam by means of inverted control data of one of the scanning directions or both, all of the mirror-like equal raster elements can be recorded. This possibility is provided by an electronic control device which is connected between the storage and the deflection control means.

The reproduction is controlled by picture signals which have been obtained during the scanning of the picture during which an analog scanning device supplies certain signal magnitudes from which by means of a clock pulse train signals are removed at equal intervals and given numerical values in accordance with the tone value scale. These numbers represent the picture signals in the form of long rows of binary coded numbers. The frequency of the clock pulse is obtained from the drive system of the reproduction device and is so determined that it should be equal to the frequency with which the surface element, that is the raster elements, are recorded. As a result, after recording each surface, that is raster element, the recording information or data of the next element becomes available.

First with reference to FIG. 3c the process of recording will be described and without the above described means enabling one to save on the storage capacity. At time zero the recording instrument, such as a light spot, projected on the recording plane by an electron beam tube, in column I sweeps over the lower border line of the field I*a* while moving in the direction of the arrow 27. By being called up through the picture signals from the storage, the recording data of the raster element I*a* is ready and controls the recording. The specific steps and apparatus of such recording will be described later.

At the beginning of the recording of raster element I*b*, the new recording data for this raster element is available. The tone value at present must be the same as it was in connection with the raster element I*a*, since the picture under recording must have a homogeneous tone. For this reason the same storage address is called up again. An interval counting device increases the address by a small amount. As a result, in the storage device a storage location will be called upon which is immediately adjacent to the storage location just used and which contains the recording information for the raster element I*b*. At the beginning of the recording of the raster element I*c*, the new recording information is again available. The tone value is again the same. By adding a small amount the address becomes again increased and again the next adjacent storage location will be called upon.

When during the process of the recording the recording means passes over the upper border of the raster element I*c* which is at the same time the border line of the parcel, the next congruent parcel is scanned which has a similar tone value, that is, it has the similar coverage spots. The triple ring counter goes back into initial position. The recording of I*a'* = I*a* will be affected. During the further process the recording of the raster elements I*a*, I*b*, I*c*, I*a'*, I*b'*. . . will be repeated until the tone value remains constant.

After a line change, that is, after a rotation of the drum, a forward displacement of the recording means takes place by the width of a raster element. In column II the recording means starts from the lower border line of the field II*a*. There must still be the same tone value present and, as a result, the same initial storage address will be called up as before.

To the horizontal drive of the recording means a second triple ring counter is coupled which after each step increases the storage address by a number equivalent to three storage locations. As a result, the very same storage location will be called upon which contains the data on the raster element II*a*. Then the recording from II*b*, and II*c*, II*a'* and II*b'* etc. takes place similarly. After a further horizontal displacement the raster elements III*a*, III*b*, III*c*, III*a'* etc. are recorded which as seen are located along the direction of the movement of the horizontal drive. Next follows the recording of a further congruent parcel which at similar tone value is composed from similar raster elements I*a*, I*b* . . . III*c*.

Figure 4:
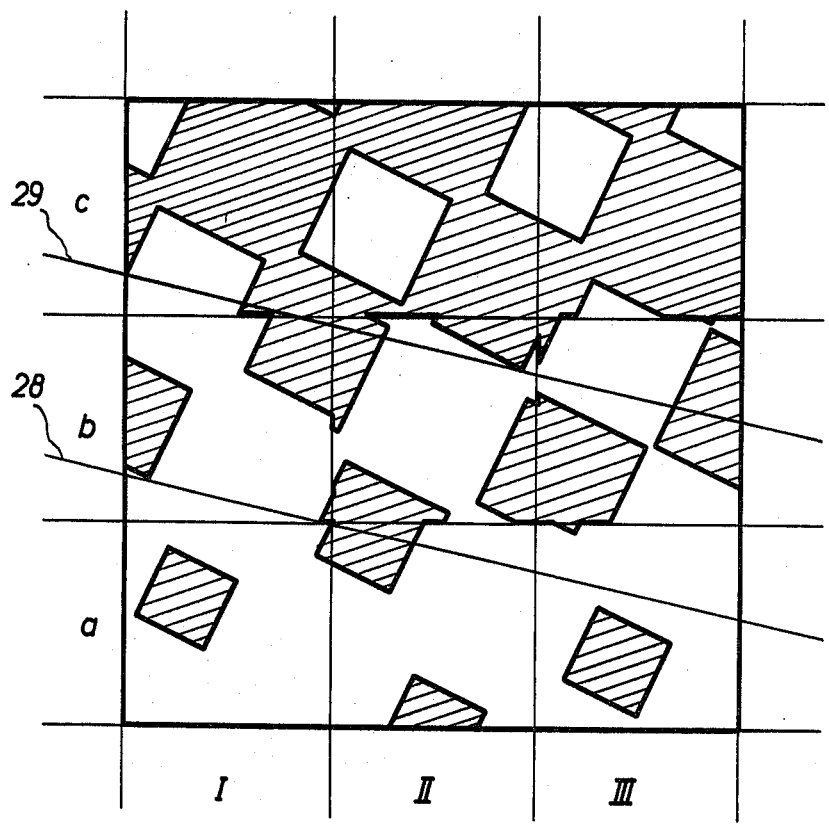
FIG. 4 is a parcel-size portion of the raster screen according to FIG. 3c having spots shown thereon representing tone values of different magnitudes.

In FIG. 4, similarly as in FIG. 3c, the parcel is divided into three columns which in turn contain three raster elements. This parcel, however, does not belong to a picture portion having a homogeneous tone value, since within the parcel there are regions adjacent to each other which have different tone values. The transition tone between these two regions which are represented by the lines 28 and 29 runs transversely across the parcel. Under the line 28 there is a homogeneous region having a light tone value, such as 20%, while above the line 29 there is again a homogeneous region, however, having a darker, that is higher tone value, such as 60%. The transition between these two differently toned regions cannot be zero even at a very sharp contrast in the picture. Also the transition zone bounded by the lines 28 and 29 which in practice can have a width of about 0.1 mm is covered with a tone value which has a range increasing from 20% to 60%. Upon reaching the lower border line of the parcel the recording data for the tone value 20% of the raster element I*a* is available. In moving further, the raster element I*b* is reached. A new storage block is called upon which contains the recording data of the parcel having tone values of 30%. In order to be able to call upon the recording data of the raster element I*b*, according to the above described method, a numerical unit is added to the initial address. The same thing happens with the new address so that also here the second storage location of this newly called upon storage block will be selected for the recording of this raster element. At the end of the recording of the raster element I*b*, the number of the tone value for the raster element I*c*, is available, and in all cases it is 60%. The storage block for the tone value 60% is selected and in accordance with the automatic address selection the third location of this block is called upon to record the raster element I*c*.

In the already discussed manner the raster elements of the second column II*a*, II*b*, to III*c* are recorded during the recording of the next picture line. According to the position of the center of the raster element in the picture the tone values are given like in the example of FIG. 4 as 20% for II*a*, 40% for II*b*, and 60% for II*c* as well as the tone value 20% for III*a*, 50% for III*b* and 60% for III*c*.

The spots which very frequently are composed from a plurality of spot portions can have various shapes. By viewing from a larger distance one may clearly recognize the contrast threshold which goes transversely through the parcel and which is divided into an upper darker and into a lower lighter region. During the reproduction the bizarre shape of the spots of the raster elements cannot be noticed because of the small size. The eye perceives a clear separating line between the two differently toned picture surfaces.

Figure 5A:
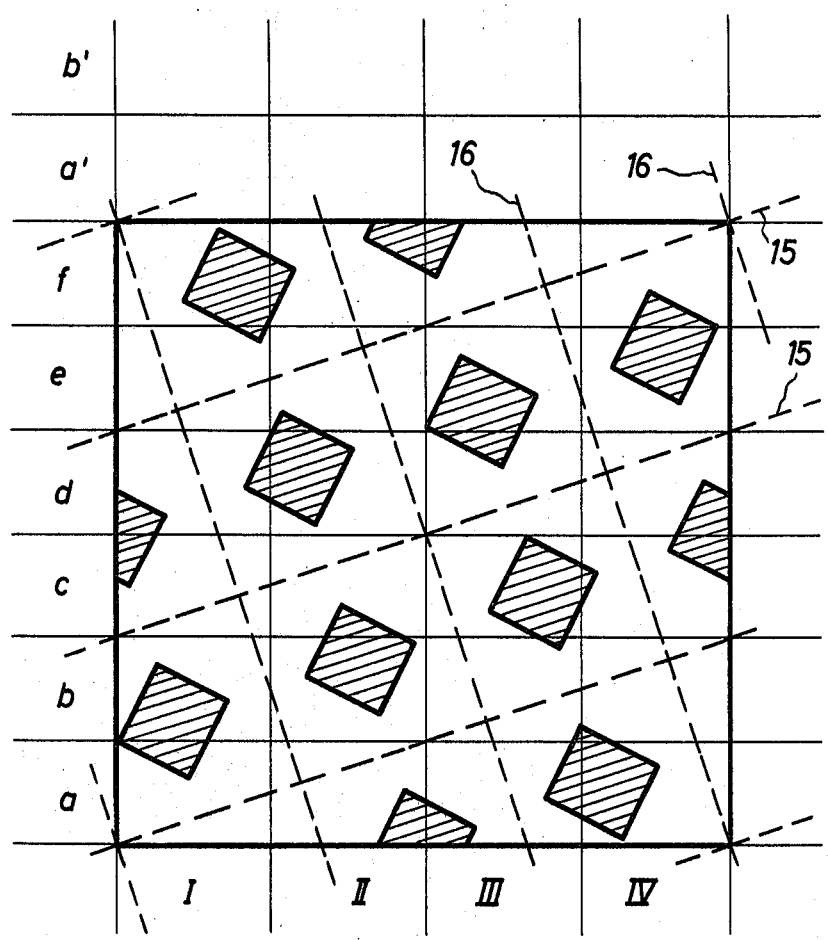
FIG. 5a is a parcel-size portion of a raster screen like in FIG. 3c but having a much finer longitudinal and transverse subdivision.
Figure 5B:
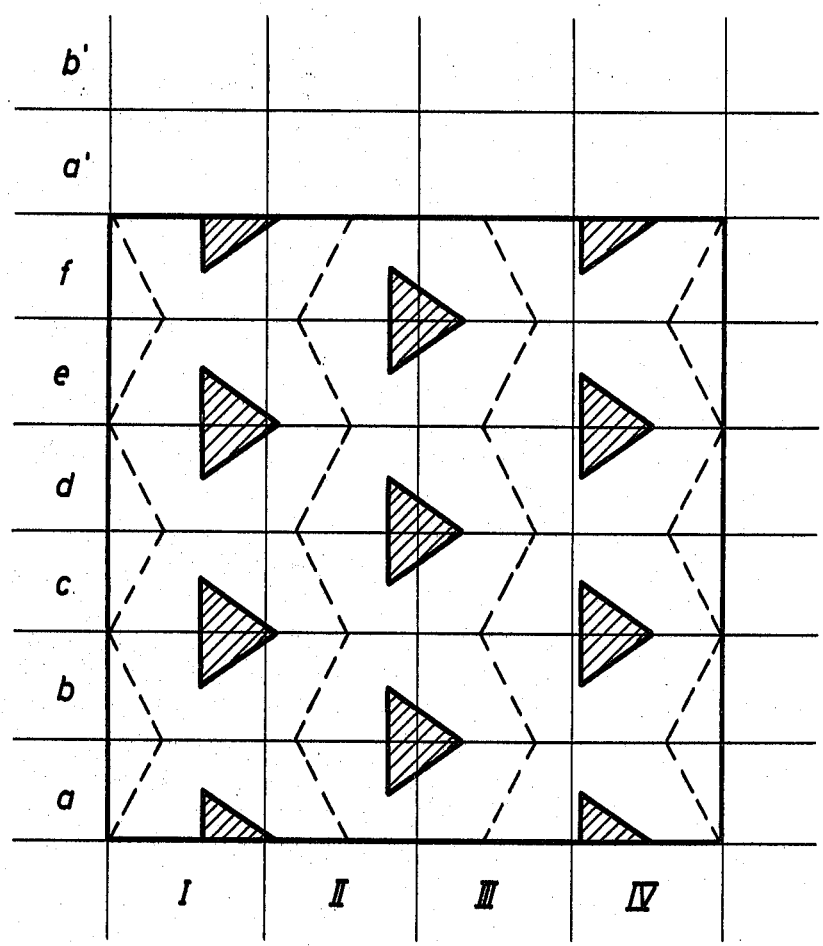
FIG. 5b is a parcel-size portion of a raster screen having hexagonal and triangular spots therein.

The invention proposes further embodiments which have been only hinted in the preceding discussion. FIG. 5*a*, for example, shows that the parcel can be divided into much narrower columns in the longitudinal direction, such as I, II . . . IV, and the columns by several transverse lines can be divided into smaller raster elements such as *a* through *f*; altogether in this manner there are obtained many more raster elements than it was the case, for example in FIG. 2. The storage space required for the recording data is much larger than it was the case with the parcel division described so far; however, also in this situation there are similar and mirror-like raster elements present whereupon the excess requirement for the storage space can be somewhat reduced.

All recording data of a parcel are arranged in the storage device following the sequence of I*a*, I*b*, I*c*, II*a* etc., directly next to each other. One may, however, consider the recording data of an entire column as a unit, and the transverse division of a column into surface elements of different magnitude can be had. For picture portions having homogeneous tone value, for example, the entire column will be recorded without subdivision. Contour rich portions, however, having strongly varying tone values require a division of the column into more and smaller surface elements which can be made different in size. In this manner, the tone values are more exact and become recorded in a fine approximation to the original. The frequency of the clock pulse which is necessary under this condition, must be so large that the scanning of the smallest surface elements obtained through the subdivision of the columns could correspond to it. By electronic means it is provided that the clock pulses are affected only when there is a tone value variation having a predetermined average magnitude since it is then only necessary to call upon an address having a new parcel with a different tone value. One could carry out the division of the columns to such an extent that finally for each recording line a surface element and correspondingly for each picture line the address of a parcel having an appropriate tone value is called upon. This extreme situation would require such a high clock pulse frequency and a storage device with such a small loop time that the reproduction could take place in the shortest possible time with fast operating machines. In practice it has been found sufficient that after several recording lines, such as four, a new tone value is obtained and, if necessary, becomes corrected.

It is to be noted that when the columns are built up from surface or raster elements of different size, there is a need for more storage capacity for the storage of the recording data of the parcels. In this case it is not possible any more to save storage capacity since there are no more mirror-image surface elements or spots present. The recording data are in general used for the direct same time reproduction of the raster components. However, they can also be stored in an automatic fashion electronically, such as on a magnetic strip in order that they could be used to control the picture recording at any desired time later. The present inventive method offers the advantage that a change of scale between the original and reproduction can be had when the clock frequency and the recording velocity are variable or, for instance, when drums of different diameters are used.

The picture recording itself is performed with the help of an electronic beam tube. During the movement of a recording carrier at a constant speed from above to downward, such as is the case with a drum-type device, the electron beam tube projects a light spot onto a light sensitive carrier, such light spot moving very quickly and always in a recurrent fashion from left to right. The amplitude of the spot movement is equal to the width of a column and, therefore, it is also equal to the width of a surface or raster element. On the record carrier or medium recording lines are produced as a result of the horizontal movement of the light spot, such horizontal recording lines describe or produce a certain column surface due to the result of the vertical movement of the record carrier. A light spot can be made by controlling the electron ray to scan either brightly or darkly. As a result, the hatched figures, the spots hereinbefore described, are produced on the record medium.

Figure 6:
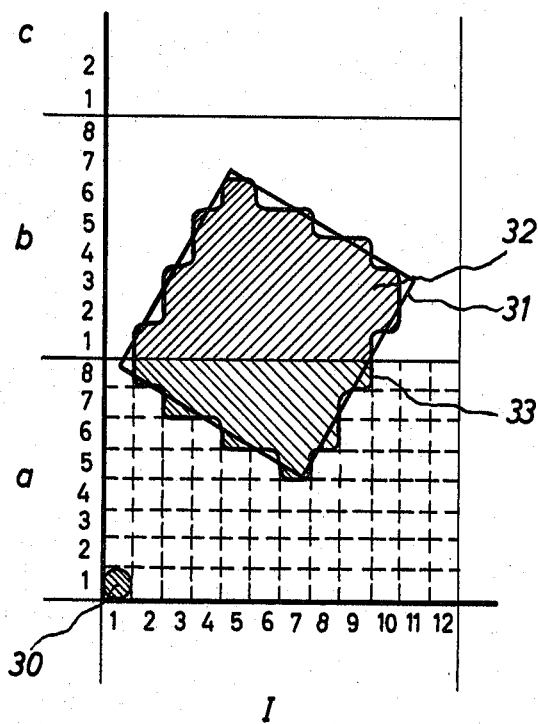

In FIG. 6 the raster elements I*a* and I*b* of the parcel are illustrated in an enlarged fashion with the spots corresponding to the showing of FIG. 5*a*. In the left lower corner of the raster element I*a* is a small circle 30 shown having a diameter which is equal to the diameter of the scanning light spot of the electron beam. The raster element I*a* comprises eight recording lines which are superimposed on each other in the horizontal direction and each of which consists of 12 units corresponding to the spot diameter. The entire raster element therefore consists of 96 point units.

A portion of the quadratic spot 31 belongs to the raster field Ia. This partial spot should be recorded or scanned most accurately with the help of the electron beam. It is noted that the above mentioned hatching process comes about automatically and only the bright-dark controlling of the scanning light spot is attained by the stored data. During this process due to the photo effect an inversion of the tone value takes place so that bright scanning by the electron beam causes a backening of the film.

The first four recording lines remain during the scanning of their twelve time units dark. The fifth recording line will be characterized by the following data: six bright, one dark, five bright. The line six will consist of: four bright, four dark, four bright; the line seven will consist of two bright, six dark, four bright, and the last recording line eight will consist of one bright, eight dark, three bright point units.

All these data at the beginning of the recording process of the raster element Ia are available in an electronic register which will be described in more detail hereinafter.

The recording of the raster element Ia is directly followed by the recording of the raster element Ib. The recording data is already called out from the storage device and has been transferred into the electronic register and controls the bright dark scanning of the electron ray during the recording. The raster element Ib contains the remaining portion of the covering spots. Since both parts of the spot are joined without a gap, the spot can be considered as a full entity.

The edges of the spot 31 during the recording undergo some distortion. The actually recorded shape of the spot 31 is represented by the hatched surface 32. The border line 33 weaves like a wave line along the sides of the spot 31. The recorded surface 32 is, however, equal to the surface of the spot 31. The rounding of the outer but inwardly curved corners of the border line 33 is the result of the circular shape of the scanning light spot. The rounding on the inner but outwardly curved corners is affected by a preliminary under exposure or by the cross-radiation of adjacent light points.

Figure 7:
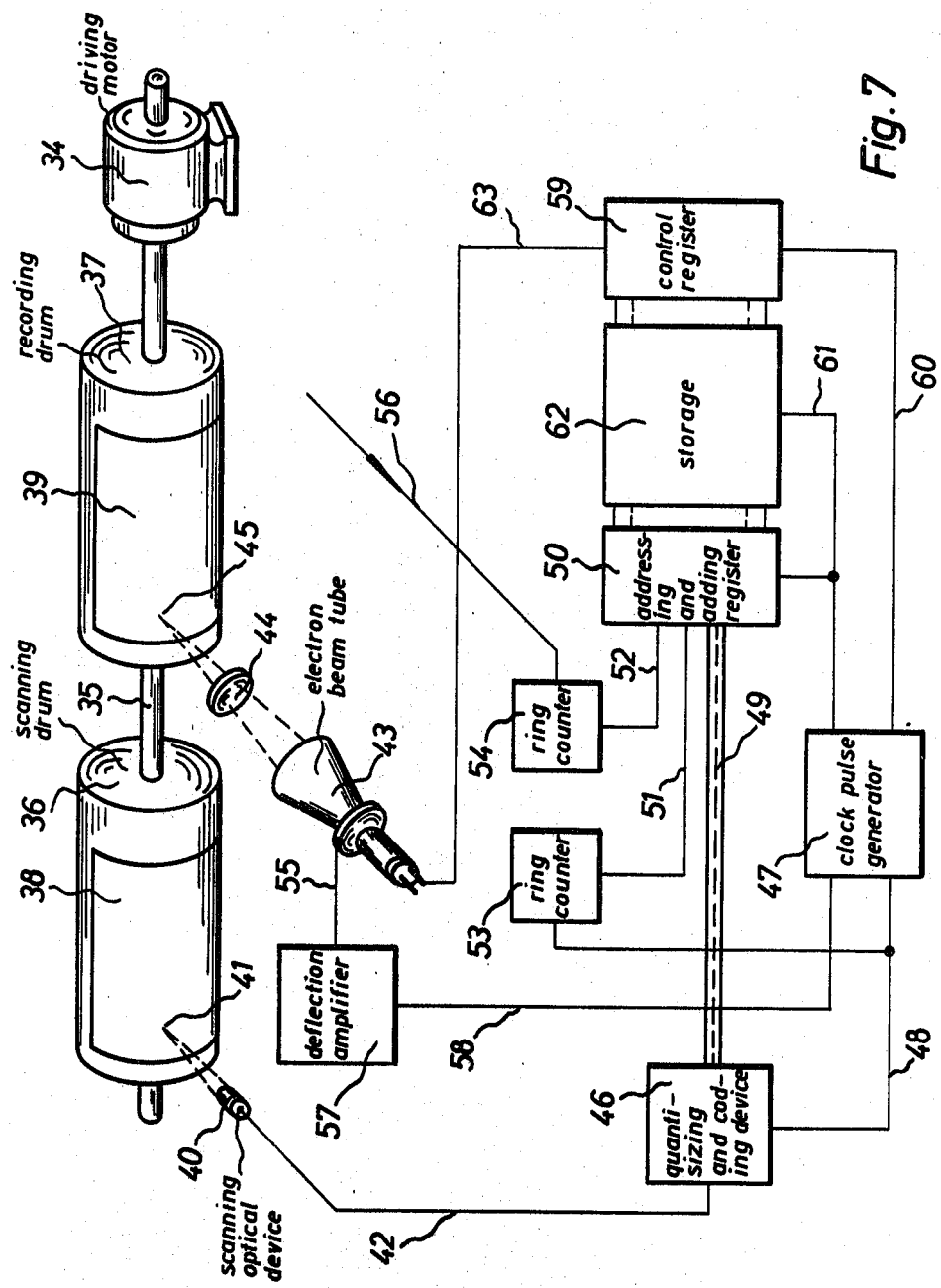
FIG. 7 is an embodiment of an apparatus for carrying out the method according to the present invention.

FIG. 7 illustrates a device for carrying out the method according to the present invention. The mechanical structure of such devices comprises a driving motor 34 which drives an axle 35 with drums 36 and 37 disposed on it at an equal and constant speed. On the drum 36 there is a picture setting 38 secured and on the drum 37 there is a light sensitive foil 39. A scanning optical device 40 scans the picture setting 38 at a certain picture location 41 and delivers through a conductor 42 electrical voltages the magnitude of which corresponds to the tone values at that picture location 41. After passing through a few electronic devices, the operation of which will be hereinafter described, the electrical signals reach in the form of control data an electron beam tube 43 and control the brightness of a light spot which is produced on the picture screen by means of an electron beam. This light spot is projected with the help of an optical device 44 onto the light sensitive foil 39 and records at the location 45 in accordance with the control data an image of the corresponding picture portion 40.

After each revolution of the drums 36, 37 an advancement is affected by an amount corresponding to the width of a column. This advancement is essential since due to it during the reproduction of a picture the entire picture surface is covered.

The electrical signals delivered through the conductor 42 reach a device 46 to which from a clock pulse generator 47 clock pulses are delivered through a conductor 48. The frequency of the clock pulses is as large that under the existing peripheral velocity of the drums the clock pulse interval corresponds to the height of a raster element or to a multiple of the recording lines. Each clock pulse in the device 46 determines the voltage directly applied to the conductor 42, and assigns to it a tone value and delivers the numerical value of such tone value in the form of a binary coded number over a conductor bunch 49 to an electronic address register 50. The above mentioned coded numbers are the initial addresses of the location in the storage device which contains all the data for the recording of all raster elements which compose the parcel having the tone value which has just been delivered. The parcel is, however, split into many columns, such as I, II and III, as shown in FIG. 3c, and each column is again split into several raster elements a, b, and c. Each of these raster elements contain a spot which corresponds or has a coverage degree of an associated tone value. The data of each individual raster element of each parcel can be located in the storage device in the following manner. The number of the tone value degree which is called upon is registered in the address register 50 in the form of a binary number. The address register 50 is connected through conductors 51 and 52 also with ring counter 53 and 54. An adding stage in the address register adds the numbers delivered through conductors 51 and 52 to the stored tone value number. The counter 53 counts sequentially the raster elements Ia, Ib, and Ic in the first column and delivers over conductor 51 the values 0, 1 and 2 into the address register 50. After returning to the null position, the recording of the first raster element Ia of the same column of the parcel which is the next in the recording direction begins. Then the next raster elements Ib and Ic are recorded upon the counting by the counter 53 in the position 1 and 2. The whole process goes on similarly until the entire picture line has been recorded. The line comprises similar columns as all the parcels lying ahead in the recording direction.

The counter 54 is in the null position during the recording of the entire picture line formed from the first columns. Before the recording of the next picture line, that is also before the beginning of the next drum rotation, an advancement is affected on both the scanning and the recording side amounting to one picture width, that is, to a column width.

The advancement itself produces a pulse which through a conductor 56 is delivered to the column counter 54 and causes it to shift by one unit. This unit is a number which corresponds to the address difference of the data group which is required by a column of a parcel.

Then comes the recording of the second picture line while now one after the other both columns, that is column IIa, IIb, and IIc of all the succeeding parcels become recorded until the counter 54 is switched further before the beginning of the third picture line, the third columns become recorded. This process goes on in this form until the reproduction is finished.

As a recording unit a raster element is used. In order that such raster element could be recorded with a certain tone value, the initial address of the storage region is called up by the picture signal, which region contains the recording data of the parcel to which the raster element belongs. The calling up of the initial address is performed over the conductor 49. The counters 54 and 53 increase this initial address in the address register 50 to such an extent that the data of the raster element having the proper position or data within the parcel is called up and becomes recorded.

The above described functional operation remains the same even when instead of raster elements small surface elements individually or in groups are recorded. Due to the clock pulse at the input of the counter 53 the frequency of which is higher here due to the finer division, one attains that during the recording of a column the data of the recording line which corresponds to the desired position within the parcel controls the electron beam.

A raster element according to the showing of FIG. 6 comprises eight recording lines. According to the above structure the frequency of the horizontal deflection of the electron beam must be determined accordingly and fed through the deflection amplifier 57 over the conductor 55. A clock pulse having a frequency eitht times higher than the recording frequency is fed over a conductor 58 to synchronize the deflection amplifier 57. During the deflection, that is during the scanning time of a horizontal recording line, the beam velocity remains constant. The time of the flyback is relatively small with respect to the scanning time.

In the case of drum scanners the beam in the vertical direction does not have to be deflected since a relative vertical movement is obtained due to the drum movement. In all electronic photo-composing machines, however, an additional vertical control of the electron beam is necessary since the record carrier or medium during the recording process does not move. All the other functional features are otherwise the same as those of the device shown in FIG. 7; it is, therefore, unnecessary to illustrate the application of the present invention to the conventional electronic photo-composing machine.

During the horizontal deflection the electron beam is scanning either brightly or darkly. The voltage for the scanning is delivered by the register 59. Also in the register 59 there is a fixed coupling with the clock pulse generator through conductor 60. In the event there is a recording line consisting of 12 point units then the register 59 must be fed with a clock pulse which is 12 times higher than the clock pulse on conductor 58. In a practical embodiment the frequency of the clock pulse on the conductor 50 is somewhat higher, such as 14 times higher since the flyback time after a horizontal deflection cannot completely be neglected.

The register 59 is a so-called shift register and operates as an intermediate storage between the data storage device 62 and between the recording tube 43. The shift register 59 contains additional electronic devices which deliver the stored data for the bright-dark controlling of the electron beam according to the following program. By inverting the sequence of the data for the horizontal recording line or by inverting the sequence of the recording lines or by inverting both, one may attain that all four mirror-symmetrical pictures of a raster element can be represented.

It is still to be noted that a change of scale between the reproduction and the original can be attained very easily by changing the diameter of the drums. However, in order to avoid any distortion of the picture, the horizontal movement of the advancing means is so controlled on the recording side that the proportion of the picture is retained.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A screen system for use in connection with the electro-optical reproduction of half-tone pictures in multi-color-print comprising, in combination:
   a plurality of partial screens each corresponding to a printing color and each being angularly spaced apart with respect to each another;
   said partial screens defining screen meshes which define printing points for tone values of the printing colors;
   said partial screens having common points of intersections defining rectangular parcels of congruent screen structure;
   said parcels including orthogonally oriented parcel elements which include said printing points.

2. An engraving device for use in connection with the electro-optical reproduction of half-tone pictures in multi-color-print comprising, in combination:
   a body;
   a plurality of partial screens defined in the surface of said body each screen corresponding to a printing color and each screen being angularly spaced apart with respect to each another;
   said partial screens defining screen meshes which define printing points for tone values of the printing colors;
   said partial screens having common points of intersections defining rectangular parcels of congruent screen structure;
   said parcels including orthogonally oriented parcel elements which include said printing points.

3. The engraving device as claimed in claim 2, wherein said body is cylindrical and said partial screens are defined in the cylindrical surface thereof.

* * * * *